United States Patent [19]
Kontturi et al.

[11] Patent Number: 4,466,053
[45] Date of Patent: Aug. 14, 1984

[54] THYRISTOR CONVERTER DRIVE

[75] Inventors: Risto Kontturi; Matti Kähkipuro; Pertti Saransaari, all of Hyvinkää, Finland

[73] Assignee: Elevator GmbH, Baar, Switzerland

[21] Appl. No.: 327,699

[22] Filed: Dec. 4, 1981

[30] Foreign Application Priority Data

Dec. 16, 1980 [FI] Finland .................................. 803932

[51] Int. Cl.³ ........................................... H02M 7/155
[52] U.S. Cl. ..................................... 363/129; 363/161
[58] Field of Search ........................... 363/44–48, 363/128, 129, 130, 160–161, 165; 323/207, 208, 218, 232, 233

[56] References Cited

U.S. PATENT DOCUMENTS 3,431,483  3/1969  Lafuze ........................ 363/161 X
3,746,963  7/1973  Venard ........................... 363/47
3,906,337  9/1975  Depenbrock .................... 363/48
4,247,888  1/1981  Ängquist ......................... 363/47

Primary Examiner—Peter S. Wong

[57] ABSTRACT

An improvement of a thyristor converter drive wherein a thyristor converter drives a load, such as an electric machine, with which a series resonance circuit (1) has been connected in parallel. The components (2,3) of the series resonance circuit (1) are so selected that the charging phase and discharging phase of the circuit have equal length.

4 Claims, 5 Drawing Figures

THYRISTOR CONVERTER DRIVE

The object of this invention is an improvement in a thyristor converter drive wherein the thyristor converter drives a load such as an electric machine in parallel with which a series resonance circuit has been added.

Such thyristor drives are already known in the art in which the thyristor converters are mains-commutated. This is understood to mean that the A.C. mains take care of quenching the conducting thyristor. The most natural practical application of mains-commutated thyristor converters are D.C. motor drives. There are other modes of application for thyristor converters, depending on how they are connected with reference to each other. For instance, a fully controlled thyristor converter may also operate as inverted converter. Furthermore, for instance, two thyristor converters may be connected in opposition, thus enabling a D.C. motor drive to be made into a four-quadrant drive.

It is also possible for thyristor converters to compose a cyclo-converter, or so-called straight frequency converter. In a cyclo-converter, each phase consists of two mains-commutated thyristor converters connected in opposition. FIG. 3 presents a possible principle circuit for a cyclo-converter. In this case the cyclo-converter consists of six one-way three-beat converters. The load of the cyclo-converter is a low-speed A.C. machine. The voltage obtained as supply to the load is formed by controlling the thyristor converters in each phase at 120° phase angle with a sinusoidal loading value.

In the foregoing a few modes of application of thyristor converters have been touched upon, which are however restricted in their use by the drawbacks introduced by the mains commutation applied in existing thyristor converters. For instance when the converters are operating as a rectifier, they will impress on the load a great multitude of harmonics in addition to the desired D.C. voltage. Similarly, in cyclo-converter use the output voltage is no pure sine wave: it contains a certain amount of harmonics. In D.C. motor driving as well as cyclo-converter operation, these harmonics cause limitations of the operational characteristics. Owing to the harmonics additional losses and various forces are produced in the electric machine, the latter giving rise to vibration and noise and impairing the torque generated by the machine. Moreover, in cyclo-converters the output voltage frequency has to be limited to comparatively low values in order that the characteristics of the electric machine might not be excessively impaired. One further drawback is the fact that when a thyristor converter operates as inverted converter (as alternator), the so-called relaxation phenomenon may occur in certain disorders, and this is equivalent to a virtual short-circuit as far as the thyristors are concerned.

The object of the present invention is to eliminate the drawbacks mentioned and to provide a technologically and economically utilizable improvement of a thyristor converter drive, and to make said drive reliable and appropriate to be used in various situations. The thyristor converter drive of the invention is characterized in that the components of the series resonance circuit are so selected that the charging phase or period and discharge phase or period of the circuit are equal in length.

A preferred embodiment of the invention is characterized in that the components of the circuit added in parallel with the load are so selected that the current pulse passing through the load in the discharge phase equals the current pulse going from the mains to the load in the charging phase.

Another preferred embodiment of the invention is characterized in that the components of the series resonance circuit are so selected that the length of the charging and discharge phases is $1/(2 \cdot p \cdot f)$, where p=pulse number of the converter and f=mains frequency.

One embodiment of the invention is furthermore characterized in that the circuit consists of a capacitor and a choke connected in series in a way known in itself in the art, of which components the data can be dimensioned to conform to the load.

In the following the invention shall be referred to as "load-commutated thyristor converter" as opposed to the mains-commutated thyristor converter. One of the advantages afforded by the problem solution as taught by the invention is that in a load-commutated thyristor converter always two pulses passing through the load are obtained instead of one single pulse. Hereby the characteristics of the apparatus approach those of a thyristor circuit built up out of mains-commutated converters having a higher pulse number and commanding a markedly higher price. It is admitted that in the load-commutated case the latter pulse has the same magnitude as the preceding pulse and it is uncontrolled. On comparison of a load-commutated apparatus and equivalent mains-commutated apparatus the characteristics of the former are found to be distinctly superior. The voltage and current obtained in the load have a curve shape substantially better than in the case of equivalent mains-commutated apparatus. In other words, the detrimental effects from harmonics have been reduced. This also implies the advantage that it is possible to use a higher supply frequency with a cyclo-converter. In FIGS. 4 and 5 are shown the current curve shapes of the mains-commutated and the load-commutated cyclo-converters, respectively. The figures clearly reveal the improvement of curve shape achieved. One further advantage is that the chance for the relaxation phenomenon encountered in alternator operation to occur has been substantially reduced.

In the following, the invention is more closely described with the aid of an example, with reference being made to the attached drawings, wherein:

FIG. 1 displays a circuit according to the invention, comprising two thyristor converters connected in opposition;

Figure 1:
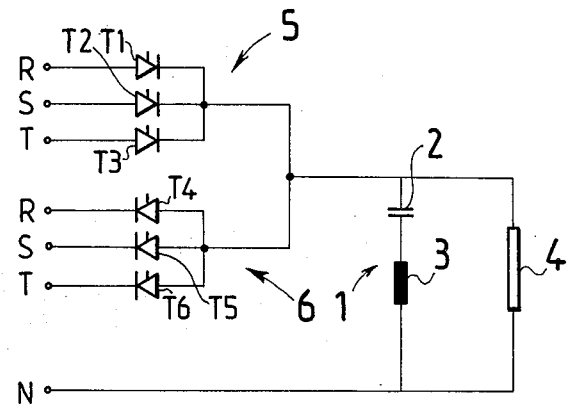
Figure 2:
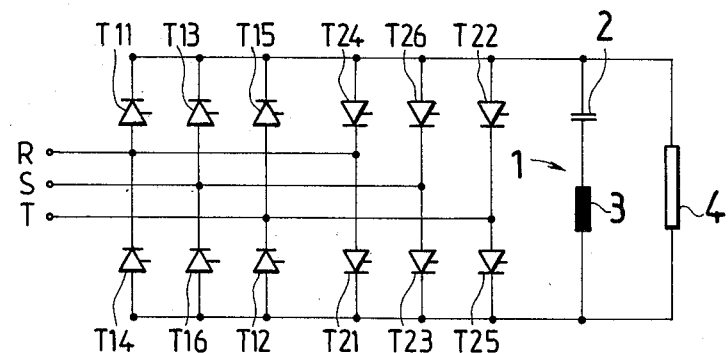
FIG. 2 shows a circuit similar to that of FIG. 1, with two-way, six-beat converters used for thyristor converters.
Figure 3:
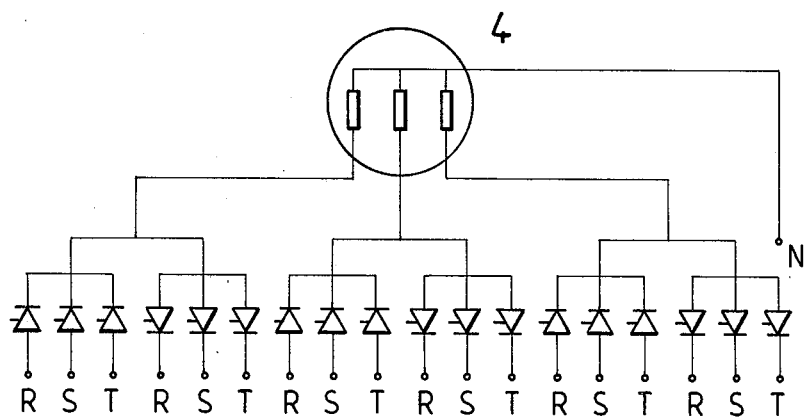
FIG. 3 shows a conventional mains-commutated cyclo-converter principle circuit diagram, using one-way, three-beat converters.
Figure 4:
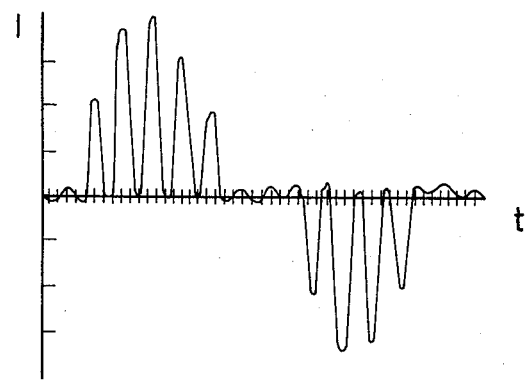
FIG. 4 shows, plotted over time, the curve shape of the current from a conventional, mains-commutated cyclo-converter.
Figure 5:
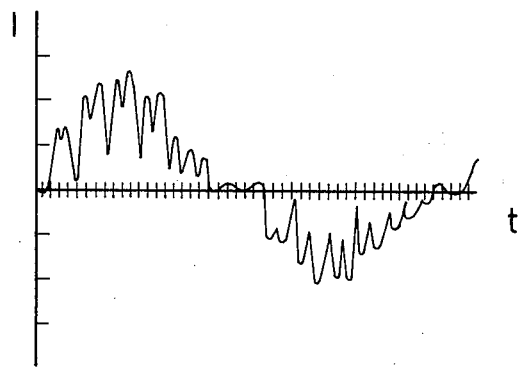
FIG. 5 shows, plotted over time, the curve shape of the current from a load-commutated cyclo-converter according to the invention.

The basis of the present invention is that a thyristor converter normally operating in mains-commutated mode is altered to operate with load commutation. This is simply achieved by adding in parallel with the load (depicted as an electric motor winding 4) a circuit 1 operating as a series resonance circuit. FIG. 1 displays the circuit diagram of two thyristor converters 5,6 in opposition, altered in this way. This circuit represents, depending on the mode of control, either a D.C. drive or the circuit of one phase of a cyclo-converter. In FIG. 1 one-way, three-beat converters have been employed. The principle of operation of the load-commutated thyristor converter can be understood by reference to FIGS. 1 and 2. When for instance thyristor T1 or thyristors T11 and T16 are conducting, a current path is set up through the resonance circuit 1 and the load 4. The thyristors carry the current both of the load and of the resonance circuit. This causes the resonance circuit 1 to be charged, which circuit consists of at least one capacitor 2 and at least one choke 3, connected in series. However, the resonance circuit 1 cannot be discharged through the said thyristors T1, T11 and T16 because the discharge current is in their blocking direction. Thus the resonance circuit 1 is always discharged through the load 4. When the discharge current of the resonance circuit reaches the magnitude of the load current, the current through thyristors T1 or T11, T16 is zero and these thyristors go out. The current now flows in the circuit constituted by the resonance circuit 1 and the load 4. As soon as the next thyristors (e.g. T2 or T11 and T12) are ignited, the same events are repeated with these thyristors. It is important that the components 2,3 in the resonance circuit are properly selected, and particular attention is paid just to this selection in the present invention.

If the problem solution as taught by the present invention is compared, for instance, with a thyristor-controlled electric motor drive provided with sound deadening circuit (the same Applicants' Finnish patent application No. 793301), the difference is a completely different principle of operation and a different dimensioning principle, although in both instances a series resonance circuit has been connected across the load. In the pertinent literature also various filtering circuits have been disclosed which have been carried out by means of series resonance circuitry, but also these circuits have an entirely different purpose of operation, and the results therewith achievable are totally different, from the corresponding functions of the series resonance circuit according to the present invention.

It is obvious to a person skilled in the art that different embodiments of the invention are not confined exclusively to the thyristor converter drive as presented in the above example and that, instead, different embodiments may vary within the scope of the claims stated below.

We claim:

1. A thyristor converter driving apparatus, comprising:
a thyristor converter driving a load, and a series resonance circuit added in parallel with said load and having components, there being a charging and discharging period associated with said resonance circuit, said components being so selected that the charging and discharging periods of the circuit have equal length; and wherein circuitry of said converter is configured for directing a discharge of said series resonance circuit solely via said load.

2. Thyristor converter drive according to claim 1, wherein the components of the series resonance circuit added across the load are so selected that a current pulse going through the load in the discharging period is equal in magnitude with a pulse going to the load from a mains in the charging period.

3. Thyristor converter drive according to claim 2, wherein the components of the series resonance circuit are so selected that the length of the charging and discharging periods is $1/(2 \cdot p \cdot f)$, where p=number of pulses of the converter and f=mains frequency.

4. Thyristor converter drive according to claim 1, wherein the circuit consists of a capacitor and a choke connected in series, the values of these two components being dimensionable to conform to the load.

* * * * *